Patented June 7, 1927.

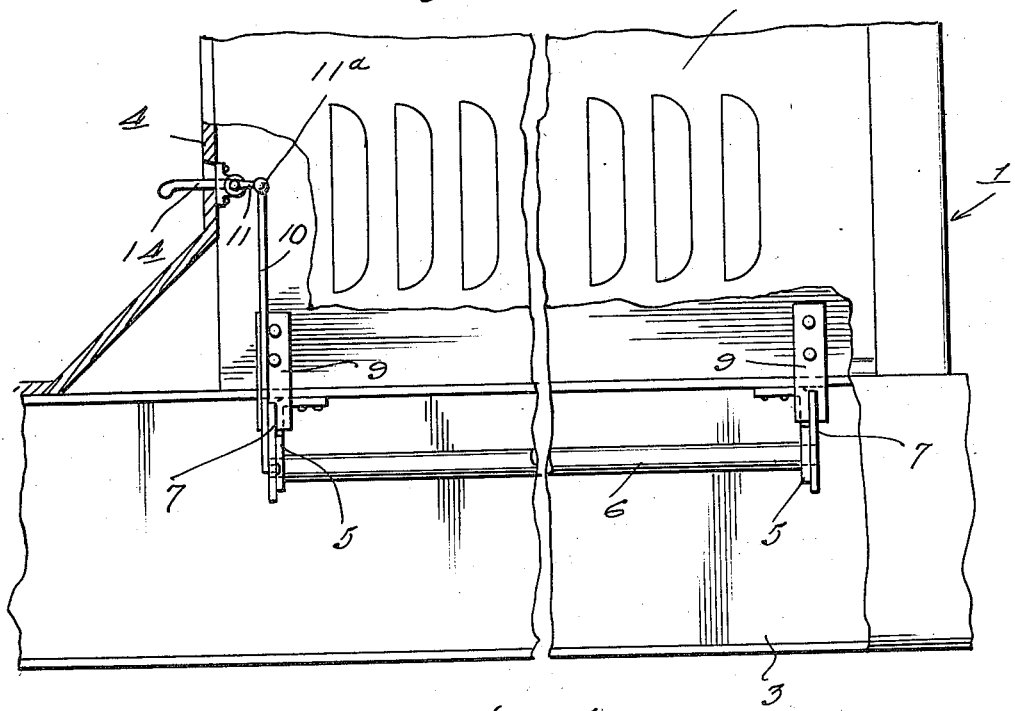
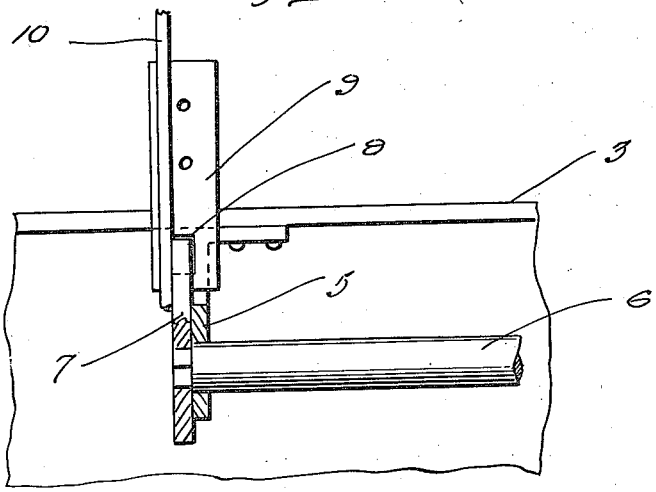

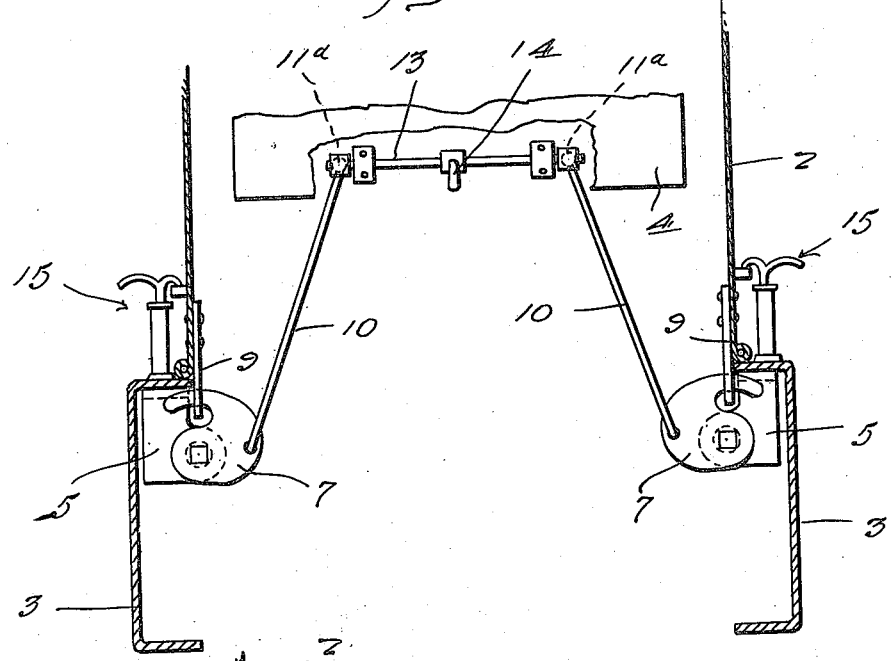
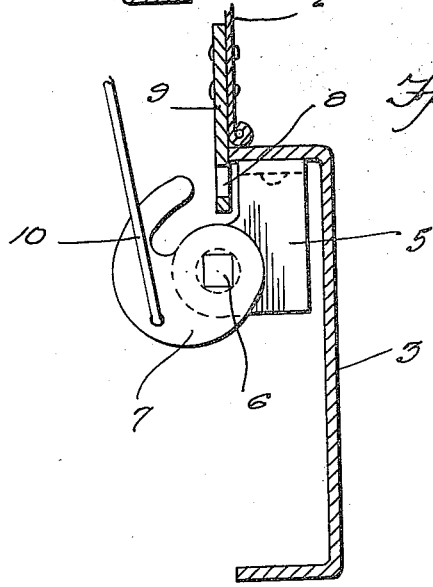
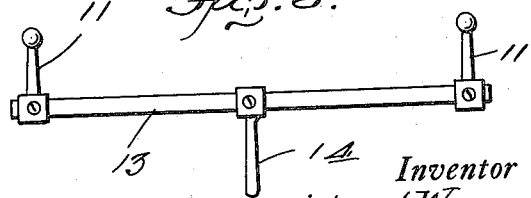

1,631,508

UNITED STATES PATENT OFFICE.

RICHARD WAGNER, OF FLINT, MICHIGAN.

AUTOMOBILE HOOD LATCH.

Application filed July 1, 1926. Serial No. 119,878.

This invention relates to an improved device which may be conveniently referred to as an automobile hood latch, the same being adapted for use in connection with the usual spring held retainer and holding devices, but being such in construction as to permit such devices to be entirely dispensed with.

Briefly, the invention has reference to a structure of this kind, which includes, among other parts, brackets attached to the swingable sides of the hood on the interior, together with oscillatory retaining hooks, which connect with these brackets, these hooks being actuated from a mechanism which is controlled from the dash board or the instrument board or at some other point within convenient reach of the operator of the machine.

My main object is to provide a device of this kind which includes simple and inexpensive parts arranged in a novel association, providing a device which is practical, easy of application, and convenient and easy to manipulate. Other features and advantages of the invention will become apparent from the following description and drawings.

In the accompanying drawings, forming a part of this application, and in which like numerals are employed to designate like parts throughout the same:

Figure 1 is a fragmentary view of a portion of an automobile, showing the radiator, hood and frame, together with one part of the improved hood retaining device.

Figure 2 is a transverse section showing the general arrangement of parts more plainly.

Figure 3 is an enlarged detail view showing one of the devices particularly.

Figure 4 is a view showing the mounting bracket for one of the devices.

Figure 5 is a perspective view of a special keeper bracket.

Figure 6 is a top plan view of an operating shaft, and means for manipulating the same.

Referring to the drawings in detail, it will be seen that the reference character 1 designates generally an automobile radiator, 2 the part of the hood, and 3 the channel bars of the chassis frame. The reference character 4 designates the dash board or equivalent part of the automobile.

The improved device comprises four separate latch devices, and a description of one will suffice for all. To this end, attention is first directed to Figure 3, wherein it will be seen that a mounting bracket 5 is fastened to the upper flange of one of the channel bars, this being provided with a bearing for reception of an oscillatory shaft 6. In this connection, I would state that the shaft is cylindrical for the greater part of its length, but the ends are of square cross section, as shown in Figure 3. The squared ends fit into square openings provided in a retaining cam or hook 7. The bill of the hook is adapted to pass through a slot 8 formed in a keeper bracket 9 which is fastened to the inner side of one of the swinging sides of the hood. A cam action is thus produced whereby the hood is drawn tightly down upon the channel bar to provide an effective closing joint here. It will be noticed from Figure 2 that there is a latch device at each end of the shaft 6, and novel operating means is provided for this shaft. The means comprises a link 10 which is connected with the cam and extends upwardly and is connected by a universal joint 11 with a crank arm 10, on a rocker shaft 13. The rock shaft is provided with a central operating handle or lever 14 which is accessible to the operator of the machine from the interior of the car. As shown, there are two shafts 6, a locking device at each end of each shaft, and a pair of operating links connected to crank arms at opposite ends of a single rock shaft 13. Obviously then, when the rock shaft 13 is actuated, the operating mechanism serves to simultaneously bring all of the locking cams 7 into place by engaging the hooks with the slot in the keeper brackets. The usual externally disposed retainers are indicated in the drawings in Figure 2, by the reference characters 15. As before stated, these may be dispensed with in view of the improved device.

From the foregoing description and drawings, it will be seen that I have evolved and produced novel structure which is operated from a single lever on the interior of the car for bringing into play a plurality of locking hooks producing a cam action upon their complemental keeper brackets for drawing the hinged sides of the hood down tightly into engagement with the frame of the automobile. One of the outstanding features of the device is that when it is used in connection with closed cars, the operator upon leaving the car may lock his door, thus rendering the operating mechanism for the device inaccessible. This will aid in guarding against the theft of the automobile, because the devices cannot be opened except from the interior of the car. These and other features and advantages of the invention have doubtless been made apparent from the foregoing description and drawings. Moreover, the details and relative arrangement is clear, and it is therefore thought that a more lengthy description is unnecessary, as a clear comprehension will undoubtedly be obtained by persons skilled in the art to which the invention relates, upon reading the description in connection with the drawings.

Although the preferred embodiment of the invention has been shown and described, it is to be understood that minor changes coming within the invention claimed may be resorted to, if desired.

I claim:

1. A hood latch of the class described comprising a mounting bracket adapted to be mounted on the interior of one of the channel bars of an automobile chassis frame, said bracket including a bearing opening, a shaft mounted for oscillation in said bearing opening, a holding cam carried by said shaft, a keeper bracket adapted to be secured to the interior of one of the swingable sides of a hood, said bracket being provided with a slot for passage of a part of said cam, a rock shaft adapted to be mounted upon a part of the automobile, an operating connection between the rock shaft and the cam, and actuating means for the rock shaft.

2. In a hood latch of the class described, a pair of mounting brackets, a shaft journaled in bearing openings in said brackets, cams carried by said shaft located adjacent said brackets, keeper brackets including slots for passage of portions of said cams, a rock shaft, a link connected with said rock shaft and one of said cams, and an operating lever for said rock shaft.

In testimony whereof I affix my signature.

RICHARD WAGNER.